United States Patent Office 3,399,153
Patented Aug. 27, 1968

3,399,153
SOLVENT - SOLUBLE, HEAT - HARDENING INTERPOLYMERS CONSISTING ESSENTIALLY OF ALKYLOLATED ACRYLAMIDES AND POLYETHYLENICALLY UNSATURATED POLYESTER RESINS
Kazys Sekmakas, Chicago, and Roland F. Stancl, Chicago Heights, Ill., assignors to De Soto Chemical Coatings, Inc., Chicago, Ill., a corporation of Delaware
No Drawing. Filed Apr. 9, 1963, Ser. No. 271,604
15 Claims. (Cl. 260—21)

The present invention relates to copolymers or interpolymers which consist essentially of polyethylenically unsaturated polyesters and amides of monoethylenically unsaturated carboxylic acids, especially acrylamides, the acrylamide-containing interpolymer being alkylolated to provide reactive alkylol groups conferring thermosetting cure characteristics. The new interpolymers are especially useful in organic solvent solution coating compositions, particularly in thermosetting combinations with hydroxyl-containing materials, hexamethylol melamine and partially hydrolyzed vinyl chloride-vinyl acetate copolymers being of outstanding value. The invention especially contemplates the use of unsaturated polyesters including a cyclopentadiene-unsaturated aliphatic polycarboxylic acid adduct as the essential ester-forming constituent of the polyester.

Alkylolated acrylamide-containing interpolymers have previously been used in organic solvent solution coating compositions. Unfortunately, the prior interpolymers have been lacking in compatibility causing many inadequacies. Moreover, the prior art has always required, as an essential element in the provision of desirable interpolymers, the inclusion of a significant proportion of a monomer other than the acrylamide component containing the $CH_2=C<$ group.

In the invention, monomer containing the $CH_2=C<$ group is eliminated to provide desirable interpolymers possessing improved compatibility with aminoplast resins, alkyd resins, epoxy resins and vinyl copolymers, especially with hexamethylol melamine and hydroxy-containing vinyl chloride copolymers. It is particularly stressed that the invention includes the achievement of a superior combination of film hardness and flexibility, especially when the polyester portion of the acrylamide interpolymer comprises the reaction product of a cyclopentadiene and monoethylenically unsaturated aliphatic dicarboxylic acid. Additionally, the systems contemplated by the invention are heat-hardening systems achieving solvent resistance through cure and providing excellent adhesion and film gloss where desired. Also, the systems of the invention may be characterized by rapid cure at elevated temperature curing conditions. The new interpolymers form clear organic solvent solutions which may be pigmented if desired.

In accordance with the invention, a polyethylenically unsaturated polyester is copolymerized with an amide of a monoethylenically unsaturated carboxylic acid, especially acrylamide, the unsaturated amide being essentially the only monoethylenically unsaturated component in the system. At least some of the amido hydrogen atoms in the interpolymer are replaced by reaction with an aldehyde and the hydroxy groups generated in this manner may be etherified in whole or in part, but preferably in minor amount or not at all. Any aliphatic alcohol, including polyhydric alcohols such as glycols, may be used for etherification.

As a result, the interpolymer includes amido hydrogen atoms replaced by the structure:

wherein R is selected from the group consisting of hydrogen, furyl, and aromatic and saturated lower aliphatic hydrocarbon radicals containing up to 10 carbon atoms, and $R_1$ is selected from the group consisting of hydrogen, and the etherification residue of aliphatic alcohol containing up to 10 carbon atoms. Preferably, R is hydrogen.

As will be more fully appreciated hereinafter, considerable variation is permissible in the kind and ratio of the aldehyde modifying agent and the etherifying agents, if used. Moreover, there is also a considerable variation which can be made in the specific nature of the copolymerizable unsaturated polyester.

While it is preferred to employ acrylamide in proportions of from 2 to 50%, preferably from 2 to 30% by weight, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

Numerous ethylenically unsaturated polyesters may be employed for copolymerization in accordance with the invention, it being understood that these polyesters are polyethylenically unsaturated and not monoethylenically unsaturated. The unsaturation can be introduced into the polyester by the polyesterification of an unsaturated polycarboxylic acid such as maleic acid, fumaric acid, itaconic acid, aconitic acid, glutaconic acid or citraconic acid, fumaric acid and maleic acid being preferred, with a saturated diol or polyhydric alcohol such as glycol, glycerine, 1,4-butane diol, pentaerythritol, or by the polyesterification of an unsaturated polyhydric alcohol such as 2-butene-1,4-diol with saturated polycarboxylic acids and their corresponding anhydrides such as oxalic acid, malonic acid, succinic acid, glutaric acid, adipic acid, pimelic acid, suberic acid, azelaic acid, sebacic acid, phthalic acid, isophthalic acid, terephthalic acid, and trimellitic acid, thus providing highly reactive unsaturation in the linear backbone of the polyester.

Further, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization with acrylamide. Incorporation of monocarboxylic acids is facilitated by the use of glycerine in the production of the polyester. When the glycerine polyester is preformed, the monoacid reacts with the secondary hydroxyl group of the glycerine residue, but, as is known, the polybasic acid, the glycerine and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as crotyl glycidyl ether.

The preferred polyesters in accordance with the invention are those formed by reaction including adduct formation of a cyclopentadiene with monoethylenically unsaturated aliphatic dicarboxylic acid and aliphatic polyhydric alcohols, especially glycols. The adduct may be preformed or adduct formation may accompany esterification or be subsequent thereto. Most preferably, dicyclopentadiene is adducted with fumaric acid in the presence of an ether glycol such as diethylene glycol so that adduct formation may accompany esterification under conditions in which it would appear that the dicyclopentadiene does not serve merely as a source of cyclopentadiene.

Thus, preferred polyester resins are provided by heat-reacting the ethylenically unsaturated dicarboxylic acid component with a glycol component, preferably an ether glycol, and a cyclopentadiene in proportions of from 0.2 to 2 mols, preferably from 0.4 to 1.5 mol of a cyclopentadiene per mol of unsaturated dicarboxylic acid. Most preferably, fumaric acid, diethylene glycol and dicyclopentadiene in proportions of from 0.6–0.9 mol of dicyclopentadiene per mol of fumaric acid are heated together to cause simultaneous adduct formation and esterification.

Preferred polyesters possess an unsaturation indicated by an iodine number of from 25 to 400, preferably from 50 to 300. The iodine numbers are measured by the Wijs method which reports the number of grams of iodine absorbed by 100 grams of unsaturated material.

The glycol component may be satisfied by any dialcohol, but preferably at least 30 mol percent, more preferably at least 50 mol percent, of the glycol component is an ether glycol such as diethylene glycol, triethylene glycol, dibutylene glycol and similar polyoxyalkylene glycols having a molecular weight up to about 1200, preferably not in excess of 600. The most preferred glycols are those of lowest molecular weight in each category, e.g., the diglycol.

The fact that ether glycols are preferred in the invention does not eliminate the presence, or even the desirability of using other glycols. Suitable glycols which may be used are illustrated by ethylene glycol, propylene glycol, butylene glycol, 1,5-pentanediol, di- and trimethylol propane, neopentyl glycol, bisphenol based diols, etc. Polyhydric alcohols containing three or more reactive hydroxyl groups such as glycerine, pentaerythritol, polyepoxides, etc., may be incorporated in minor amounts up to 20 mol percent, especially where it is desired to include a proportion of fatty acid in the polyester.

The preferred acid is fumaric acid, though optimum properties are not unduly sacrificed by the presence of up to 50 mol percent, based on the total mols of unsaturated dicarboxylic acid, of other ethylenically unsaturated acids, typically maleic acid or anhydride. Preferably, unsaturated diacids other than fumaric acid are present in an amount not exceeding 15 mol percent. Of course, a minor proportion up to about 25 mol percent, based on total acid, may be saturated, as is illustrated by phthalic acids, adipic acid, azelaic acid, sebacic acid, dimerized fatty acids, etc.

As previously indicated, a diene component is desirably used in the proportions which have been noted. The dienes contemplated are hydrocarbons, dicyclopentadiene being preferred. While dicyclopentadiene is important, minor amounts, up to 50 mol percent of the dicyclopentadiene component, may be replaced by other dienes such as cyclopentadiene, any of the pentadienes, 1,4-butadiene, tricyclopentadiene, and tetracyclopentadiene. Preferably, at least 75 mol percent of the diene component is dicyclopentadiene. It is to be understood that, while dicyclopentadiene is preferred, any of the above listed materials may less desirably be used in the invention.

The carboxylic acid and the hydroxy-containing components of the polyester are desirably used in equivalent proportions of from 1.5:1 to 1:1.5, preferably in equivalent proportions of from 1.25:1 to 1:1.25. It is particularly preferred to employ at least 5 equivalent percent of excess hydroxyl functionality. It should also be understood that the term "acid" is intended to include acid anhydrides.

While the polyester may be made to include excess carboxyl or hydroxyl functionality, it is preferred to employ hydroxyl-functional polyester resins, especially those having an hydroxyl functionality indicated by an hydroxyl number of from 10–300 (milligrams of KOH to saponify 1 gram of resin). Although the preferred polyesters contain an excess of hydroxyl functionality, it should be noted that the polyester need not be completely reacted so that it includes free carboxyl groups which act as an internal catalyst to provide rapid cures at elevated temperature, especially when the extent of interpolymer etherification is minimized, as is more fully taught in the prior application of Kazys Sekmakas, Ser. No. 225,871, filed Sept. 24, 1962, now U.S. Patent No. 3,257,475, issued June 21, 1966, the disclosure of which is hereby incorporated by reference.

While the molecular weight of the unsaturated polyester is of secondary significance so long as the polyester is not gelled, it is desirable to employ polyesters which have a viscosity in n-butanol at 80% solids in the range of from C to Z–6, preferably in the range of from V to Z–2 measured on the Gardner-Holdt scale at 25° C. Since vinyl monomers are substantially completely excluded and since very small amounts of an acrylamide are highly effective to provide extensive curing capacity, the polyester is desirably of relatively high molecular weight, and may, at minimum acrylamide content, exceed the viscosities which have been noted.

The proportion of fatty acid which is incorporated in the polyester is of secondary significance in the invention. Indeed, the fatty acid may be entirely omitted. However, it is preferred to have a proportion of fatty acid present. Thus, the polyester may include 5–20% by weight of the polyester of fatty acid, and preferably from 5–10% by weight, based on the total weight of the polyester of fatty acid. In the preferred embodiment of the invention, unsaturated fatty acids derived from the drying oils including semi-drying oils are preferred such as tall oil fatty acids, linseed oil fatty acids, safflower oil fatty acids, etc.

With respect to resin production, there are two procedural facets of particular interest. First, it is possible, as disclosed in the prior application of Kazys Sekmakas, Ser. No. 100,804, filed Apr. 5, 1961, now U.S. Patent No. 3,163,623, issued Dec. 29, 1964 the disclosure of which is hereby incorporated by reference, to carry out the addition polymerization between the acrylamide component and the unsaturated polyester component at the same time that the aldehyde component is reacted with amido hydogen atoms. In other words, polymerization and alkylolation may advantageously be accomplished at the same time and in a single stage. A basic catalyst may be used as taught in said prior application. It has now been found that in the absence of any significant proportion of vinyl monomer other than acrylamide, and especially when the proportion of acrylamide is used in small amount, that the single stage polymerization and alkylolation may be carried out without gelation in the absence of a basic catalyst. Also, the need for extraneous free-radical polymerization catalysts depends upon the extent and character of the polymerization which is to take place and, when polymerization is restricted to the formation of an adduct between the acrylamide component and the cyclopentadiene component, extraneous polymerization catalyst is not essential.

Second, it is desirable to advance the resin as far as possible in molecular weight without gelation and it has been found that this goal is favored by dividing polyester formation into two stages, the latter of which is combined with the desired polymerization. This is accomplished in the invention by first forming an acid diester monomer using at least two carboxyl equivalents of acid including the dicarboxylic acid component for each hydroxyl equivalent in the glycol component. This acid diester monomer is then simultaneously reacted with additional glycol including other polyols and the acrylamide component. The acid diester monomer is desirably formed in the presence of the cyclopentadiene component so that adduct formation largely precedes polymerization with the acrylamide component.

All of the foregoing will be illustrated in the examples presented herewith.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free-radical generating polymerization catalysts is too well known to require elucidation except to point out that typical catalysts are illustrated in the examples.

The aldehyde modifying agent is desirably used in an amount of from 0.2-5 equivalents of aldehyde, and preferably in an amount of from 1-4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde, and furfural, or substances yielding an aldehyde, such as paraformaldehyde, hexamethylene tetramine or trioxymethylene can also be used.

Etherification of the aldehyde-modified amide interpolymer is not essential. Lower alcohols containing up to 10 carbon atoms, especially butanol and ethoxy and butoxy ethanol are preferred for etherification and the etherification reaction may be carried out up to 100% of the alkylol radical present in the interpolymer although little or no etherification is preferred. When less than 100% etherification is effected, as is preferred, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a hydrocarbon radical introduced by the aldehyde modifying agent and R$_1$ is the residue of the alcohol produced by the etherification reaction. When the etherifying alcohol is a glycol, the group R$_1$ is hydroxy-terminated, but this is permissible in the invention in which the presence or absence of etherification is a mere matter of choice.

While the interpolymers of the present invention are importantly useful alone in organic solvent solution coating compositions, they also exhibit excellent compatibility with other film-forming resinous materials, and are desirably applied in admixture therewith, the term "admixture" including partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins. Good compatibility with other film-forming resins extends to alkyd resins, epoxy resins and vinyl resins. Also, the resinous materials may be employed alone, or in combination with one another.

Of especial note in connection with the present invention and as features thereof, excellent compatibility exists with hexamethylol melamine and hydroxy-containing addition copolymers illustrated particularly by copolymers of vinyl chloride-vinyl acetate which have been partially hydrolyzed or saponified to convert a portion of the acetate groups to hydroxyl groups. The hydroxyl group provided in the addition copolymer referred to and in the hexamethylol melamine is highly reactive with the amido alkylol group of the acrylamide interpolymer and also with the hydroxyl groups of the unsaturated polyester to provide a rapid cure at elevated temperature producing insoluble coatings characterized by unusual flexibility coupled with significant hardness, properties which are normally antagonistic with respect to one another. Preferred copolymers contain from 80-92% by weight of vinyl chloride, with the balance of the copolymer being essentially vinyl acetate, and with a portion of the vinyl acetate converted to vinyl alcohol to provide a vinyl alcohol content of from 2-10% by weight, preferably from 3-8% by weight.

In the provision of blends in accordance with the invention, the proportions of the resinous materials which are blended may vary over the weight range of from 5:95 to 95:5. Preferably, the acrylamide interpolymer is used in proportions of from 20-90%, based on the weight of the mixture of resinous materials, and most preferably the acrylamide interpolymer is present in a major proportion of from 50-90%, based on the total weight of resinous material, especially when the acrylamide content of the interpolymer is in the range of from 2-20%, based on the weight of the interpolymer.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with the other resinous materials listed hereinbefore, from a compatible organic solvent solution. These coating solutions may be pigmented or contain dyes, flow control agents, waxes and various other components as will be evident to those skilled in the art.

In the examples which follow, all parts are by weight, unless otherwise indicated.

Example 1

An oil-modified unsaturated polyester containing side chain unsaturation useful in the invention is prepared by charging by weight, 250 parts of crotonic acid, 400 parts isophthalic acid, 790 parts of dehydrated castor oil fatty acids, and 785 parts of glycerine, into a reactor equipped with an agitator, thermometer, nitrogen inlet tube, Dean-Stark trap and condenser. The mixture is heated to 420° F. and maintained at this temperature until an acid value of 10 is reached. The mixture is cooled to 380° F. and there are then added to the mixture 166 parts of a technical grade of 1,1'-isopropylidenebis(p-phenyleneoxy)di-2-propanol, 235 parts of phthalic anhydride and 125 parts of adipic acid, and the mixture is maintained at 420° F. until an acid value of 15-16 is reached. Butyl alcohol is then added to the product to provide a solution containing 80% solids.

The final characteristics of the polyester are:

| | |
|---|---|
| Solids (percent) | 80.1 |
| Viscosity (Gardner) | Z |
| Color (Gardner) | 6-7 |
| Acid value (non-volatile) | 16 |

Example 1A

An interpolymer is produced containing 10% acrylamide and 90% of the polyester resin of Example 1 as indicated below.

| | Charge composition, grams |
|---|---|
| Polyester of Example 1 (80% solids) | 1150 |
| Aromatic hydrocarbon solvent (boiling range of 145-195° C.) | 400 |
| Acrylamide | 100 |
| n-Butanol | 130 |
| 2-Butoxy ethanol | 130 |
| Formaldehyde (40% solution) in n-butanol | 200 |
| Di-tert-butyl peroxide | 5 |
| Cumene hydro-peroxide | 5 |

Procedure for polymerization

The interpolymer is prepared by charging into a reactor equipped with an agitator, condenser, Dean-Stark trap, thermometer and nitrogen inlet tube, 400 grams of the aromatic hydrocarbon solvent and 1150 grams of the polyester solution of Example 1. The initial charge is heated to 260° F.

The 100 grams of acrylamide are dissolved in the solvents (130 grams of n-butanol; 215 grams of 2-butoxy ethanol) and the 200 grams of 40% formaldehyde solution in n-butanol and the 10 grams of peroxide catalysts are added to the acrylamide-solvent solution.

The above acrylamide solution is added to the hot polyester solution in the reactor over a 2½ hour period of time and the mixture is maintained at 250–260° F. while concomitantly removing water by azeotropic distillation, the water being collected in the Dean-Stark trap.

After 17 grams of water are distilled off, the Dean-Stark trap is removed and the reaction mixture is held at reflux temperature for an additional 8–9 hours.

The resulting interpolymer has the following final characteristics:

Solids (percent) _____ 57.0
Viscosity (Gardner) _____ T–U
Color (Gardner) _____ 6–7
Acid value _____ 13.2

The interpolymer of Example 1A is evaluated as a white enamel containing 28% of titanium dioxide and 32% of non-volatile resin. The enamel is ground in a pebble mill to obtain a 7½ North Standard grind gauge reading. The resin is used alone and in combination with various modifying resins at set forth in Table I, in which a 0.003" draw down of the enamel is made on bare steel panels and baked for 20 minutes at 350° F.

The excellent heat-hardening cure obtained using solvent-soluble, heat-hardening aminoplast resins is self-evident from the data reported in Table I.

mixture is maintained at 400° F. until the acid value is lowered to 40 and the product is thinned with n-butanol to 90% solids to provide a solution having the following characteristics:

Solids (percent) _____ 90
Viscosity (Gardner) _____ Z
Acid value _____ 40

Example 2A

Interpolymer consisting of 12% acrylamide and 88% of the polyester resin of Example 2.

Charge composition, grams
Aromatic hydrocarbon solvent (boiling range of
  145–195° C.) _____ 400
Formaldehyde (40% solution) in n-butanol _____ 45
Polyester of Example 2 (90% solids) _____ 100
Acrylamide _____ 100
n-Butanol _____ 130
2-butoxy ethanol _____ 215
Formaldehyde (40% solution) in n-butanol _____ 150
Polyester of Example 2 _____ 650
Triethyl amine _____ 3
Di-tert-butyl peroxide _____ 5
Azobisbutyronitrile _____ 5
Tert-dodecyl mercaptan _____ 8

Procedure for polymerization

The interpolymer is prepared by charging into a reactor equipped with an agitator, condenser, Dean-Stark trap, thermometer, a separatory funnel and nitrogen inlet tube, 400 grams of the aromatic hydrocarbon solvent, 45 grams of 40% formaldehyde solution n-butanol and 100 grams of the polyester solution of Example 2. The initial charge is heated to 260° F.

The 100 grams of acrylamide are dissolved in the sol-

TABLE I

| Modifier | Percent modification | Percent interpolymer of Example 1A | Gloss and appearance | Pencil hardness | Flexibility | Toluol resistance |
|---|---|---|---|---|---|---|
| None (control) | | 100 | Very good | B | Excellent | Fair. |
| Benzoguanamine-Formaldehyde Resin [1] | 25 | 75 | do | 2H | do | Excellent. |
| Melamine-Formaldehyde Resin [2] | 25 | 75 | do | 2H | do | Do. |
| Urea-Formaldehyde Resin [3] | 25 | 75 | Good | 2H–3H | do | Do. |
| Epoxy Resin [4] | 25 | 75 | Very good | H | do | Fair. |
| Benzoguanamine-Formaldehyde Resin [1] and Epoxy Resin [4] | 25  20 | 55 | do | H–2H | do | Excellent. |
| Benzoguanamine-Formaldehyde Resin [1] and Castor Oil Baking Alkyd [5] | 25  20 | 55 | Good | H | do | Good. |

[1] The benzoguanamine-formaldehyde resin is a condensation product of 4 mols of formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.
[2] The butylated melamine-formaldehyde resin is a condensation product of 5.5 mols of formaldehyde with 1 mol of melamine in the presence of excess butanol and formic acid catalyst to provide a solvent-soluble, heat-hardening resin. The melamine-formaldehyde resin is used in the form of a 50% solids solution in 40/10 butanol/xylol solvent mixture which exhibits the following physical characteristics: Viscosity, 320 centipoises; mineral spirits tolerance, 9.5/1 (95 cc./10 grams); acid number, less than 1.0.
[3] The butylated urea-formaldehyde resin is a condensation product of 2.2 mols of formaldehyde with 1 mol of urea in the presence of excess butanol and oxalic acid catalyst to provide a solvent-soluble, heat-hardening resin. The urea-formaldehyde resin is used in the form of a 54% solids solution in 40/10 butanol/xylol solvent mixture which exhibits the following physical characteristics: viscosity, 460 centipoises; mineral spirits tolerance, 25 cc./10 grams resin.
[4] The epoxy resin is a substantially diglycidyl ether of 2,2'-bis(p-hydroxyphenylpropane) having a molecular weight of about 1,000, an epoxide equivalent weight of about 500 (grams per epoxide equivalent weight), and a melting point of from 65–75° C.
[5] The castor oil baking alkyd is the polyesterification reaction product of 33.8% dehydrated castor oil, 39% phthalic anhydride, 25.5% glycerine and 1.7% benzoic acid prepared by heating the castor oil, 11 parts of glycerine and 0.03 parts of lead oxide to 450° F. until the product is soluble in an equal volume of methyl alcohol, cooling the resulting product to 380° F., and adding to the cooled product phthalic anhydride, benzoic acid and 14.5 parts of glycerine, and heating to 420° F. until the acid value is reduced to 6.

Example 2

An oil free polyester is prepared from the following components:

Parts by weight
Adipic acid _____ 495
Phthalic anhydride _____ 840
Maleic anhydride _____ 300
2-ethyl hexanol _____ 75
Diethylene glycol _____ 1290
Hydroquinone _____ 0.6
Xylol _____ 60

All of the ingredients are charged to a reactor and heated to 400° F. using a nitrogen sparge. The reaction vents (130 grams of n-butanol; 215 grams of 2-butoxy ethanol) and the 150 grams of 40% formaldehyde solution in n-butanol, 650 grams of the polyester of Example 2, 8 grams of tert-dodecyl mercaptan, and the catalysts (3 grams of triethyl amine, 5 grams of di-tert-butyl peroxide, and 5 grams of azobisbutyronitrile) are added to the acrylamide-solvent solution.

The above acrylamide solution is added to the hot polyester solution in the reactor over a 2 hour period from the separatory funnel and the mixture is maintained at 260–270° F. for a period of 6–7 hours. During this period, 30 grams of water and 200 grams of n-butanol are distilled off.

The resulting interpolymer has the following final characteristics:

Solids (percent) _____ 55.9
Viscosity (Gardner) _____ R–S
Color (Gardner) _____ 6

The product of the present example is well adapted for coating use in accordance with the present invention.

EXAMPLE 3

An oil-modified unsaturated polyester containing side chain unsaturation useful in the invention is prepared by charging by weight, 250 parts of crotonic acid, 400 parts isophthalic acid, 790 parts of dehydrated castor oil fatty acid, and 575 parts of glycerine into a reactor equipped with an agitator, thermometer, nitrogen inlet tube, Dean-Stark trap and condenser. The mixture is heated to 420° F. and maintained at this temperature until an acid value of 10 is reached. The mixture is cooled to 380° F. and then there are added to the mixture 165 parts of a technical grade of 1,1'-isopropylidenebis(p-phenyleneoxy) di-2-propanol, 235 parts of phthalic anhydride and 150 parts of adipic acid, and the mixture is maintained at 420° F. until an acid value of 14–17 is reached. Butyl alcohol is then added to the product to provide a solution containing 80% solids.

The final characteristics of the polyester are:

Solids (percent) _____ 79.8
Viscosity (Gardner) _____ Z
Color (Gardner) _____ 5–6
Acid value _____ 16.6

EXAMPLE 3A

An interpolymer is produced containing 10% acrylamide and 90% of the polyester resin of Example 3 as indicated below.

Charge composition, grams
Polyester of Example 3 (79.8% solids) _____ 1150
Xylol _____ 400
Acrylamide _____ 100
n-Butanol _____ 50
2-butoxy ethanol _____ 50
Formaldehyde (40% solution) in n-butanol _____ 200
Xylol _____ 250
Di-tert-butyl peroxide _____ 5
Cumene-hydro-peroxide _____ 5

Procedure for polymerization

The interpolymer is prepared by charging into a reactor equipped with agitator, condenser, Dean-Stark trap, thermometer, separatory funnel and nitrogen inlet tube, 400 grams of xylol and 1150 grams of the polyester of Example 3. The initial charge is heated to 260° F.

The 100 grams of acrylamide are dissolved in the solvents (50 grams of butanol and 50 grams of 2-butoxy ethanol) and the 200 grams of 40% formaldehyde solution in n-butanol, the 250 grams of xylol and the 5 grams of di-tert-butyl peroxide are added to the acrylamide-solvent solution.

The above acrylamide solution is added to the hot polyester solution in the reactor over a 2½ hour period of time and the mixture is maintained at 250–260° F. while concomitantly removing water by azeotropic distillation, the water being collected in the Dean-Stark trap.

After 20 cc. of water are distilled off, the Dean-Stark trap is removed and the reaction mixture is held at reflux temperature for an additional 3 hours.

The 5 grams of cumene-hydro-peroxide are then added and the reaction mixture is held at 230–235° F. for an additional 6–7 hours until a viscosity (Gardner) of T–U is reached. The mixture is then cooled and filtered.

The resulting interpolymer has the following final characteristics:

Solids (percent) _____ 49.3
Viscosity (Gardner) _____ T–U
Color (Gardner) _____ 6
Acid value (non-volatile) _____ 12.7

The interpolymer of the present example is evaluated as a flat coating for aluminum coil. The coating comprises a blend of the interpolymer, modifying resin, optional plasticizer and pigment according to the following formulation:

28% resinous vehicle solids
32% pigmentation
  (Pigment composition)
  49% titanium dioxide
  49% talc
  2% finely divided silica flatting agent 60% total solids The enamel is applied on the aluminum coil using a #40 wire wound draw down rod and baked 1½ minutes at 475° F.

The excellent rapid, heat-hardening cure obtained using partially hydrolyzed vinyl chloride-vinyl acetate copolymers is self-evident from the data reported in Table II.

TABLE II

| Modifier | Percent modification | Percent interpolymer of Example 3A | Flow | Pencil hardness | Flexibility | Adhesion |
| --- | --- | --- | --- | --- | --- | --- |
| Vinyl chloride-vinyl acetate copolymer.[6] | 50 | 50 | Excellent | H-2H | Passed ⅛" conical mandrel | Passed 40" pounds reverse impact. |
| Vinyl chloride-vinyl acetate copolymer and. | 40 | 40 | do | H-2H | do | Passed 60" pounds reverse impact. |
| Expoxidized oil | 20 | | | | | |

[6] A copolymer containing 91% vinyl chloride, 3% vinyl acetate and 6% vinyl alcohol and having an intrinsic viscosity in 1% cyclohexanone at 20° C. of 0.57.

Examples 4 and 5

Examples 4 and 5 illustrate the preparation of oil-modified unsaturated polyester-acrylamide polymers by adducting dicyclopentadiene with maleic anhydride in the presence of a molar deficiency of polyhydric alcohol to provid an unsaturated diester which is then simultaneously reacted with additional polyhydric alcohol and acrylamide so that polyesterification and addition copolymerization take place simultaneously to provide the acrylamide interpolymer to the invention. These interpolymers are prepared from the following components:

| | Parts by weight | |
| --- | --- | --- |
| | Example 4 | Example 5 |
| Maleic anhydride | 500 | 500 |
| Tall oil fatty acid | 160 | |
| Coconut oil fatty acid | | 160 |
| Diethylene glycol | 250 | 250 |
| Dicyclopentadiene | 550 | 550 |
| Xylol | 20 | 20 |
| Diethylene glycol | 370 | 385 |
| Acrylamide | 100 | 60 |
| Glycerine | 30 | 60 |
| 40% formaldehyde solution in n-butanol | 100 | 100 |
| Aromatic hydrocarbon solvent (boiling range of 145–195° C.) | 880 | 880 |

Procedure for polymerization

The interpolymer is prepared by charging into a reactor equipped with agitator, condenser, Dean-Stark trap, thermometer, separatory funnel and nitrogen inlet tube, the maleic anhydride, the fatty acid, the diethylene glycol, the dicyclopentadiene and the xylol, the initial charge being heated to 350° F. to provide a maleic acid-dicyclopentadiene adduct in the form of a diester with diethylene glycol, acrylamide, and glycerine is added to the reaction mixture is cooled to 300° F. and a mixture of diethylene glycol, acryamide, and glycerine is added to the reaction mixture. The mixture is then heated to 350° F. followed by a slow increase to 420° F. which temperature is maintained until an acid value of 12–15 is reached. After cooling the reaction mixture to 250° F. the 40% formaldehyde solution in n-butanol is added and the mixture is refluxed for 60 minutes. The aromatic hydrocarbon solvent is then added to the reaction mixture to produce a final product of 60% solids.

The resulting interpolymers have the following final characteristics:

|  | Example 4 | Example 5 |
|---|---|---|
| Solids (percent) | 62.1 | 62.3 |
| Viscosity (Gardner) | M | M |
| Color (Gardner) | 9 | 6 |
| Acid value | 13.2 | 15.8 |

The products of the present examples are well adapted for coating use in accordance with the present invention.

Example 6

An oil-modified unsaturated polyester-acrylamide interpolymer containing a fumaric acid-dicyclopentadiene adduct is prepared from the following components:

| | Parts by weight |
|---|---|
| Fumaric acid | 600 |
| Tall oil fatty acids | 160 |
| Diethylene glycol | 250 |
| Dicyclopentadiene | 550 |
| Xylol | 20 |
| Diethylene glycol | 370 |
| Glycerine | 30 |
| Acrylamide | 60 |
| 40% formaldehyde solution in butanol | 100 |
| Aromatic hydrocarbon solvent (boiling range of 145–195° C.) | 950 |

Procedure for polymerization

The interpolymer is prepared by charging into a reactor equipped with agitator, condenser, Dean-Stark trap, thermometer, separatory funnel and nitrogen inlet tube, the 600 parts of fumaric acid, the 160 parts of fatty acid, the 250 parts of diethylene glycol and the 550 parts of dicyclopentadiene along with 20 parts of xylol, the initial charge being heated to 350° F. to provide fumaric acid-dicyclopentadiene adduct in the form of a diester with diethylene glycol. After an acid value of 250 is reached, the reaction mixture is cooled to 300° F. and a mixture of 370 parts diethylene glycol, 30 parts glycerine, and 60 parts acrylamide is added to the reaction mixture. The mixture is then heated to 350° F. followed by a slow increase to 420° F. which temperature is maintained until an acid value of 12–15 is reached. After cooling the reaction mixture to 250° F. the 40% formaldehyde solution in n-butanol is added and the mixture is refluxed for 60 minutes. The aromatic hydrocarbon solvent is then added to the reaction mixture to produce a final product of 60% solids.

The resulting interpolymer has the following final characteristics:

| | |
|---|---|
| Solids (percent) | 61.2 |
| Viscosity (Gardner) | I–J |
| Acid value (non-volatile) | 8.5 |

The interpolymer of Example 6 exhibits good compatibility with various resinous materials, especially aminoplast resins, and vinyl chloride-vinyl acetate copolymers. Unpigmented test samples consisting of 75% of the interpolymer of Example 6 and 25% of the modifying resin are prepared by applying the composition onto bare steel panels, employing a 3 mil doctor blade, and then baking for 20 minutes at 325° F. in a gas fired oven.

The blends exhibit good hardness and good flexibility as will be apparent from the results reported in Table III.

TABLE III

| Modifying Resin | State Uncured | State Cured | Pencil Hardness | Reverse Impact |
|---|---|---|---|---|
| Melamine-formaldehyde resin ([2], Table I). | Clear | Clear | 4H | Passes 80" lbs. |
| Benzoguanamine-formaldehyde resin ([1], Table I). | do | do | 3H | Do. |
| Urea-formaldehyde resin [7] | do | do | 2H | Do. |
| Vinyl chloride-vinyl acetate copolymer ([6], Table II). | do | do | 4H | Do. |

[7] The butylated urea-formaldehyde resin is the condensation product of 2.225 mol of formaldehyde per mol of urea in the presence of excess butanol and phthalic anhydride catalyst to provide a solvent-soluble, heat-hardening resin. The urea-formaldehyde resin is used in the form of a 50% solids solution in 50/50 butanol/xylol solvent mixture which has the following physical characteristics: Viscosity, 900 centipoises at 25° C.; percent butylation, 34.6.

Cure characterization

A pigmented sample of the resin of Example 6 for cure characterization is evaluated. The sample is composed of:

| | Percent |
|---|---|
| Titanium dioxide | 28 |
| Nonvolatile resin of Example 6 | 32 |

Bare steel panels, tin plate, aluminum, and galvanized steel panels are used and baked at various combinations of temperatures and times. The physical properties are an indication of curing characteristics on the various substrates.

Cures are obtained at virtually all combinations attempted as can clearly be seen from the results reported in Table IV.

TABLE IV

| Applied On | Panel Steel | Tinplate | Aluminum | Galvanized Steel |
|---|---|---|---|---|
| Time baked | 20 minutes | 10 minutes | 1 minute | 1½ minutes. |
| Temperature baked | 325° F. | 400° F. | 500° F. | 500° F. |
| Applied with | 3 mil blade | #16 wire wound rod. | #38 wire wound rod. | #38 wire wound rod. |
| Yellowing | None | None | None | None. |
| Reverse impact (in.-lbs.) | Passes 80 | Passes 80 | Passes 70 | Passes 80. |
| Pencil hardness | HB | | B | HB. |
| Conical mandrel | Passes ⅛ | | | |
| 2T bend | | | No failure | No failure |
| 60" solvent resistance with toluene. | Good | Good | Good | Good. |

Evaluation of gloss enamels using various modifiers

A gloss enamel base is evaluated hereinafter. The enamel is composed of:

| | Percent |
|---|---|
| Titanium dioxide pigment | 28 |
| Nonvolatile resin solids | 32 |
| Solids | 60 |

The enamels are drawn down onto bare steel panels using a #38 wire wound rod and baked for 20 minutes at 325° F. The following results are obtained.

TABLE V

| Percent modification, remainder resin of Example 6 | 25% benzo- guanamine- formaldehyde resin (¹, Table I) | 12.5% mela- mine resin [8] | 12.5% epoxy resin (⁴, Table I) | 12.5% vinyl chloride-vinyl acetate copolymer (⁶, Table II) |
|---|---|---|---|---|
| 60 Gloss | 97 | 98 | 91 | 83. |
| Appearance | Good | Good | Good | Good. |
| Reverse impact (in.-lbs.) | Pass 80 | Pass 80 | Pass 50 | Pass 70. |
| Pencil hardness | H | 3H | H | 4H. |
| Conical mandrel | Pass ⅛″ | Pass ⅛″ | Pass ⅛″ | Pass ⅛″. |
| Solvent resistance | Good | Good | Good | Good. |
| Yellowing (upon bake testing) | Slight | Slight | Slight | Slight. |

[8] The melamine resin is a hexamethylol melamine etherified with methyl alcohol.

Similar results are obtained upon aluminum, the film being applied using a #38 wire wound rod followed by baking in a gas fired oven for 1 minute at 500° F.

Preparation of vinyl organisols

Vinyl organisols may also be advantageously used in accordance with the invention as illustrated by the example which follows in which the following formulation is used:

30% titanium dioxide
30% nonvolatile resin composed of:
    65% resin of Example 6
    30% vinyl chloride-vinyl acetate copolymer
    (Note 6, Table II)
    5% vinyl resin [9]

The vinyl organisol when baked for three minutes at 400° F. exhibits 90° glos, B pencil hardness, 80 in.-lbs. reverse impact, good mar resistance, but yellows slightly.

The invention is defined in the claims which follow.

We claim:

1. A solvent-soluble, heat-hardening, non-gelled interpolymer of: (A) an acrylamide in an amount of from 2–50% by weight, based on the weight of the interpolymer; and (B) the balance of the interpolymer consisting essentially of polyethylenically unsaturated polyester; said interpolymer being reacted with from 0.2–5 equivalents of aldehyde per amide group in said interpolymer.

2. An interpolymer as recited in claim 1 in which said unsaturated polyester contains an at least 5% excess of hydroxyl functionality over carboxyl functionality.

3. An interpolymer as recited in claim 1 in which formaldehyde is reacted with acrylamide.

4. A solvent-soluble, heat-hardening, non-gelled interpolymer of: (A) an acrylamide in an amount of from 2–50% by weight, based on the weight of the interpolymer; and (B) the balance of the interpolymer consisting essentially of polyethylenically unsaturated polyester which is the reaction product of components comprising aliphatic polyhydric alcohol, monoethylenically unsaturated dicarboxylic acid and hydrocarbon diene in an amount of from 0.2–2.0 mols per mol of unsaturated dicarboxylic acid; said interpolymer being reacted with from 0.2–5 equivalents of aldehyde per amide group in said interpolymer.

5. An interpolymer as recited in claim 4 in which said polyester contains components providing hydroxyl groups and components providing carboxyl groups in an equivalent ratio of from 1.5:1 to 1:1.5.

[9] The vinyl resin is a 100% vinyl chloride resin having an intrinsic viscosity in cyclohexanone at 20° C. of 1.52.

6. A solvent-soluble, heat-hardening, non-gelled interpolymer of:
(A) an amide of an ethylenically unsaturated carboxylic acid in an amount of from 2–50% by weight, based on the weight of the interpolymer; and
(B) the balance of the interpolymer consisting essentially of polyethylenically unsaturated polyester comprising:
(1) aliphatic polyhydric alcohol;
(2) monoethylenically unsaturated dicarboxylic acid; and
(3) diene comprising a major molar proportion of a cyclopentadiene in an amount providing from 0.2–2.0 mol of diene per mol of unsaturated dicarboxylic acid;
said interpolymer having amido hydrogen atoms replaced by the structure:

in which R is selected from the group consisting of hydrogen, furyl, aromatic and saturated lower aliphatic hydrocarbon radicals containing up to 10 carbon atoms, and $R_1$ is selected from the group consisting of hydrogen and the etherification residue of aliphatic alcohol containing up to 10 carbon atoms.

7. An interpolymer as recited in claim 6 in which said polyhydric alcohol consists essentially of glycol and said polyester contains components providing hydroxyl groups and components providing carboxyl groups in an equivalent ratio of from 1.5:1 to 1:1.5, and said polyester has an iodine number of from 25 to 400.

8. An interpolymer as recited in claim 7 in which said amide is acrylamide in an amount of from 2–30% by weight, R is hydrogen, at least 50% of $R_1$ is hydrogen, and said polyester contains an at least 5% excess of hydroxyl functionality over carboxyl functionality.

9. A solvent-soluble, heat-hardening, non-gelled interpolymer of:
(A) an acrylamide in an amount of from 2–50% by weight, based on the weight of the interpolymer; and
(B) the balance of the interpolymer consisting essentially of polyethylenically unsaturated polyester; said polyester comprising:
(1) aliphatic polyhydric alcohol consisting essentially of glycol;
(2) monethylenically unsaturated dicarboxylic acid; and
(3) a cyclopentadiene in an amount providing from 0.2–2.0 mol per mol of said unsaturated acid;
the components providing hydroxyl groups and the components providing carboxyl groups being present in said polyester in an equivalent ratio of from 1.5:1 to 1:1.5, and said interpolymer being reacted with formaldehyde to generate methylol groups in said interpolymer.

10. An interpolymer as recited in claim 9 in which acrylamide is employed in an amount of from 2–30% and said polyester contains an excess of hydroxyl functionality of from 5–25%.

11. An interpolymer as recited in claim 9 in which the polyhydric alcohol component contains up to 20 mol percent of a polyhydric alcohol containing at least 3 hydroxyl groups and said polyester includes from 5–20% by weight, based on the total weight of said polyester, of an unsaturated fatty acid.

12. A method for producing a solvent-soluble, heat-hardening, non-gelled alkylolated interpolymer consisting essentially of an amide of an ethylenically unsaturated carboxylic acid and polyethylenically unsaturated polyester comprising maintaining at an elevated reaction temperature of from 300–425° F. in the absence of alkaline agent, an organic solvent solution of said amide, said polyester and compound providing aldehyde to simultaneously cause addition polymerization of said amide with said polyester and coreaction of amido hydrogen atoms with said aldehyde.

13. A method of producing a solvent-soluble, heat-hardening, non-gelled interpolymer consisting essentially of: (A) an amide of an ethylenically unsaturated carboxylic acid; and (B) polyethylenically unsaturated polyester, comprising reacting glycol with at least 2 mols of monoethylenically unsaturated dicarboxylic acid per mol of said glycol to form an acid diester, and then reacting said acid diester with polyhydric alcohol and said amide to cause said amide to participate in addition polymerization while simultaneously esterifying said acid diester with said polyhydric alcohol.

14. A method as recited in claim 13 in which said diester is produced in the presence of a cyclopentadiene.

15. A solvent-soluble, heat-hardening, non-gelled interpolymer of:

(A) an acrylamide in an amount of from 2–50% by weight, based on the weight of the interpolymer; and
(B) the balance of the interpolymer consisting essentially of polyethylenically unsaturated polyester; said polyester comprising:
  (1) aliphatic polyhydric alcohol consisting essentially of ether glycol;
  (2) monoethylenically unsaturated dicarboxylic acid comprising a major proportion of fumaric acid; and
  (3) dicyclopentadiene in an amount of from 0.6–0.9 mol per mol of unsaturated dicarboxylic acid;

the components providing hydroxyl groups and the components providing carboxyl groups being present in said polyester in an equivalent ratio of from 1.5:1 to 1:1.5, and said interpolymer being reacted with formaldehyde to generate methylol groups in said interpolymer.

References Cited
UNITED STATES PATENTS

| | | | |
|---|---|---|---|
| 3,257,475 | 6/1966 | Sekmakas | 260—850 |
| 3,278,638 | 10/1966 | Sekmakas | 260—850 |
| 2,940,945 | 6/1960 | Christenson et al. | 260—21 |
| 3,037,963 | 6/1962 | Christenson | 260—21 |
| 3,118,853 | 1/1964 | Hart et al. | 260—897 |
| 3,163,615 | 12/1964 | Sekmakas | 260—21 |

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,399,153　　　　　　　　　　　　　　August 27, 1968

Kazys Sekmakas et al.

It is certified that error appears in the above identified patent and that said Letters Patent are hereby corrected as shown below:

In the heading to the printed specification, lines 8 to 9 "De Soto Chemical Coatings, Inc." should read -- DeSoto, Inc. --. Column 2, line 9, "agents" should read -- agent --. Columns 7 and 8, footnote 2 thereof, line 1, "ia" should read -- is --. Column 8, line 33, after "solution" insert -- in --. Column 10, line 55, "interpolymer to" should read -- interpolymer of --. Column 11, line 5, "glycol, acrylamide, and glycerine is added to" should read -- glycol. After an acid value of 250 is reached, --; line 7, "acryamide" should read -- acrylamide --. Column 13, line 42, "glos" should read -- gloss --.

Signed and sealed this 10th day of February 1970.

(SEAL)
Attest:

EDWARD M. FLETCHER, JR.　　　　　　　　　WILLIAM E. SCHUYLER, JR
Attesting Officer　　　　　　　　　　　　Commissioner of Patents